United States Patent
Itoh (10) Patent No.: US 8,018,521 B2
(45) Date of Patent: Sep. 13, 2011

(54) IMAGE REPRODUCING APPARATUS, IMAGE RECORDER, IMAGE REPRODUCING METHOD, IMAGE RECORDING METHOD, AND SEMICONDUCTOR INTEGRATED CIRCUIT

(75) Inventor: Masanori Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 12/091,620

(22) PCT Filed: Oct. 6, 2006

(86) PCT No.: PCT/JP2006/320085
§ 371 (c)(1),
(2), (4) Date: Apr. 25, 2008

(87) PCT Pub. No.: WO2007/049449
PCT Pub. Date: May 3, 2007

(65) Prior Publication Data
US 2009/0128646 A1    May 21, 2009

(30) Foreign Application Priority Data

Oct. 26, 2005  (JP) .................................. 2005-310754

(51) Int. Cl.
*H04N 5/222* (2006.01)
(52) U.S. Cl. ................................................. 348/333.05
(58) Field of Classification Search .............. 348/333.03, 348/333.05, 333.11; 345/659
See application file for complete search history.

(56) References Cited

U.S. PATENT DOCUMENTS

| | | | |
|---|---|---|---|
| 5,592,220 A | 1/1997 | Ishii et al. | |
| 5,973,734 A * | 10/1999 | Anderson | 348/239 |
| 6,262,769 B1 * | 7/2001 | Anderson et al. | 348/333.1 |
| 6,384,831 B1 * | 5/2002 | Nakamura et al. | 345/503 |
| 6,940,545 B1 * | 9/2005 | Ray et al. | 348/222.1 |
| 7,046,286 B1 * | 5/2006 | Kobayashi et al. | 348/333.06 |
| 7,199,901 B2 * | 4/2007 | Watanabe et al. | 358/1.9 |
| 7,205,610 B2 * | 4/2007 | Koyama | 257/348 |
| 7,206,017 B1 * | 4/2007 | Suzuki | 348/36 |
| 7,250,968 B2 * | 7/2007 | Ito | 348/240.2 |
| 7,298,409 B1 * | 11/2007 | Misawa | 348/333.01 |
| 7,444,065 B2 * | 10/2008 | Yamauchi et al. | 386/95 |
| 7,643,704 B2 * | 1/2010 | Jackson et al. | 382/298 |
| 7,649,552 B2 * | 1/2010 | Fukuda | 348/220.1 |

(Continued)

FOREIGN PATENT DOCUMENTS

EP    0 709 753    5/1996

(Continued)

OTHER PUBLICATIONS

International Search Report issued Jan. 23, 2007 in International (PCT) Application No. PCT/JP2006/320085.

(Continued)

*Primary Examiner* — Jason Chan
*Assistant Examiner* — Gary Vieaux
(74) *Attorney, Agent, or Firm* — Wenderoth, Lind & Ponack, L.L.P.

(57) ABSTRACT

When displaying an image taken as portrait-oriented image in a landscape-oriented display area, a cutout image including a partial area of the portrait-oriented image to be displayed is displayed. At that time, a whole image of the port-oriented image which is rotated based on rotation information thereof may be displayed along with the cutout image.

8 Claims, 7 Drawing Sheets

U.S. PATENT DOCUMENTS

| | | |
|---|---|---|
| 2002/0181784 A1 | 12/2002 | Shiratani |
| 2003/0156197 A1* | 8/2003 | Watanabe et al. .......... 348/207.2 |
| 2003/0169343 A1 | 9/2003 | Kagaya et al. |
| 2004/0070626 A1 | 4/2004 | Matsumoto |
| 2005/0146631 A1* | 7/2005 | Shelton et al. ........... 348/333.12 |
| 2007/0071361 A1* | 3/2007 | Sanno ........................... 382/298 |

FOREIGN PATENT DOCUMENTS

| | | |
|---|---|---|
| EP | 1 408 452 | 4/2004 |
| JP | 5-91404 | 4/1993 |
| JP | 2002-262155 | 9/2002 |
| JP | 2002-358522 | 12/2002 |
| JP | 2003-259296 | 9/2003 |
| JP | 2004-104213 | 4/2004 |
| JP | 2004-180267 | 6/2004 |
| JP | 2005-123930 | 5/2005 |
| JP | 2005-173471 | 6/2005 |
| JP | 2005-277857 | 10/2005 |

OTHER PUBLICATIONS

International Preliminary Report on Patentability issued May 8, 2008 in International (PCT) Application No. PCT/JP2006/320085.

* cited by examiner

IMAGE REPRODUCING APPARATUS, IMAGE RECORDER, IMAGE REPRODUCING METHOD, IMAGE RECORDING METHOD, AND SEMICONDUCTOR INTEGRATED CIRCUIT

TECHNICAL FIELD

The present invention relates to an apparatus (e.g. digital still camera, camcorder) for recording and/or reproducing images, and particularly relates to a recording method and a reproducing method for an image which is taken with a recording apparatus rotated.

BACKGROUND ART

In recent years, there have been increasingly widespread digital devices (camcorder, digital still camera, camera-equipped mobile phone, and so on) capable of recording and storing an image (video) taken and a sound (audio) as digital data in an optical disk such as a DVD and Blu-ray (registered trademark), magnetic disk such as a hard disk drive, and recording medium such as a semiconductor memory.

Further, as digital broadcasting and hi-vision home televisions have been introduced, an aspect ratio of image to be taken has been shifted from 4:3 to 16:9. Further, regarding a digital still camera, a digital still camera which has the aspect ratio of not only 4:3 but also 16:9 and is capable of taking images in hi-vision size, have appeared on the market.

When such an image is displayed on a home television designed for hi-vision digital broadcasting, an image with aspect ratio of 16:9 is displayed on full screen.

Incidentally, for example when an image is taken with a digital camera, there are several types of usage of the digital camera, including a usage type where the camera is held horizontally (in a normal orientation), a usage type where the camera is held with its right side turned upward (in a 90-degree rotated orientation), and a usage type where the camera is held with its left side turned upward (in a 270-degree rotated orientation). In particular, in the case of taking an image with the camera vertically held, a built-in sensor of the camera detects that the user has taken a picture while vertically holding the camera, and records, as orientation information, a value corresponding to 90 degrees or 270 degrees showing the inclination of the camera to a file header of a JPEG file to be recorded as taken picture data.

Figure 6A:
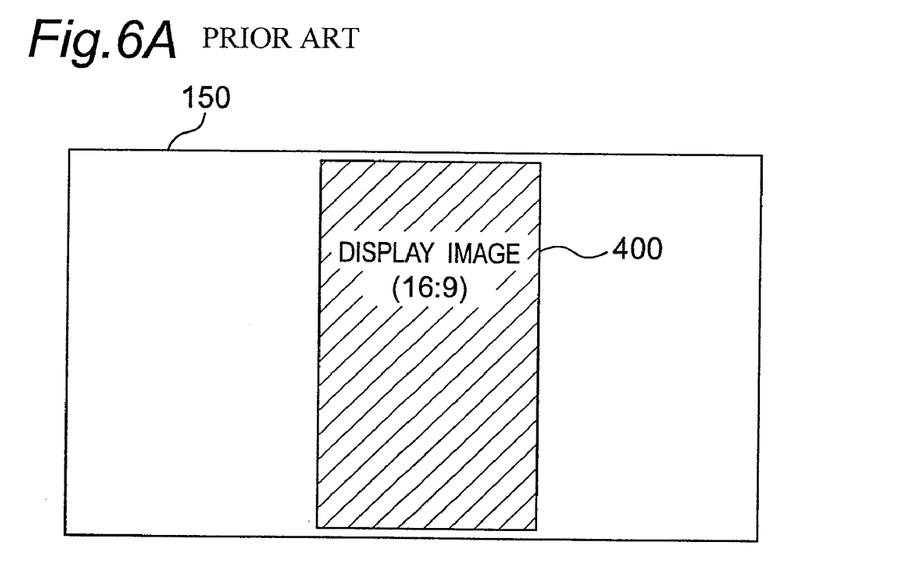
FIG. 6A is a view showing an example of display of a vertically long image on a wide screen.
Figure 6B:
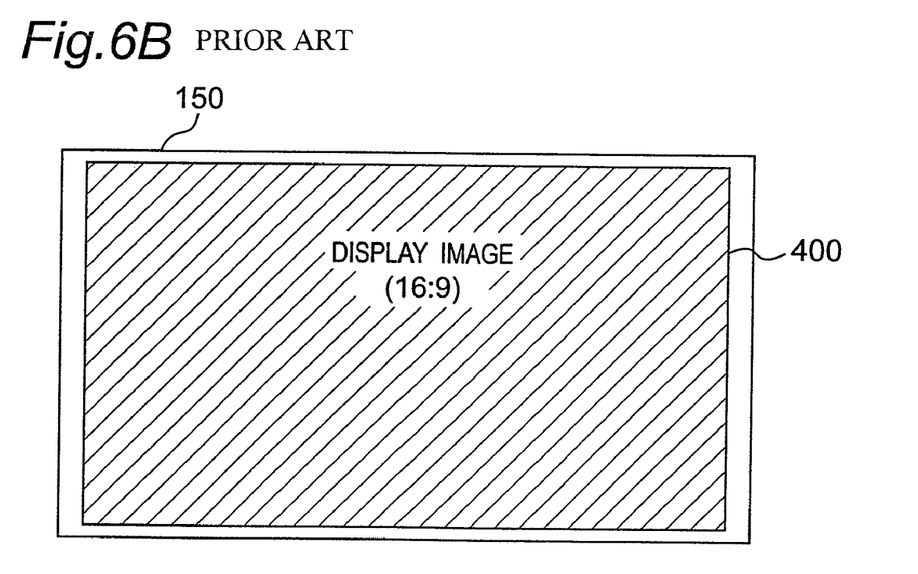
FIG. 6B is a view showing an example of display of a landscape-oriented image on the wide screen.

Subsequently, when reproducing the JPEG file on the digital camera, the orientation information in the file header of the recorded JPEG file is referred to, and a picture is displayed in an orientation corresponding to an inclination shown by the orientation information. For example, when the value of 90 degrees is recorded in the orientation information, as shown in FIG. 6A, a reproduced image 400 having the aspect ratio of 16:9 is displayed in the vertical orientation on a display screen 150 having the aspect ratio of 16:9 on a LCD (liquid crystal display) monitor mounted on the camera body. Similar display applies to a case where an analog signal output of the digital camera is connected to a home television. On the other hand, when the value of 0 degrees is recorded in the orientation information, as shown in FIG. 6B, the reproduced image 400 is displayed in the horizontal orientation on a LCD monitor.

It is noted that Patent Document 1 discloses, as a related technique, an example method of displaying a still image having an aspect ratio of 4:3 on the monitor screen of the aspect ratio of 16:9.
Patent Document 1: JP 2005-173471 A.

DISCLOSURE OF INVENTION

Problems to be Solved by the Invention

As shown in FIG. 6A, when reproducing an image having the aspect ratio of 16:9 and taken with a camera vertically held on a television having the aspect ratio of 16:9, a LCD monitor, or the like having the aspect ratio of 16:9, there is a problem in that the image is displayed significantly small, making it difficult to view the image.

The present invention is made for solving the above problem, and has an object to provide an image reproducing apparatus and reproducing method and an image recording apparatus and recording method, which are capable of improving visibility at the time of reproducing a picture taken with a digital camera vertically held.

Means for Solving the Problem

In a first aspect of the invention, provided is an image reproducing apparatus for reproducing image information from a recording medium storing image information and rotation information that shows whether an image represented by the image information is portrait-oriented or landscape-oriented. The image reproducing apparatus includes a reading section that reads image information from the recording medium, a rotation information reading section that reads rotation information of the image information from the recording medium, and a decoder that generates an image signal based on the read image information and the read rotation information. The decoder generates the image signal such that a cutout image including a part of an image represented by the read image information is displayed, when the rotation information shows that the image represented by the image information is portrait-oriented.

In a second aspect of the invention, an image recording apparatus is provided. The image recording apparatus includes an input section that inputs image information, a rotation information detecting section that detects rotation information showing whether an image represented by the image information is portrait-oriented or landscape-oriented, an area setting section that sets a cutout area which is a part of an area represented by the image information and an area to be displayed at the time of reproduction when the image represented by the image information is portrait-oriented, and a recording section that records the image information, the rotation information, and information regarding the cutout area to a recording medium, with those pieces of information being correlated.

In a third aspect of the invention, provided is an image reproducing method of reproducing image information from a recording medium storing the image information and rotation information that shows whether an image represented by the image information is portrait-oriented or landscape-oriented. The image reproducing method comprising the steps of: reading image information from the recording medium; reading rotation information of the image information from the recording medium; and generating an image signal based on the read image information and rotation information. In the step of generating the image signal, the image signal is generated such that a cutout image including a part of an image represented by the read image information is displayed, when the rotation information shows that an image represented by the image information is portrait-oriented.

In a fourth aspect of the invention, an image recording method is provided. The image recording method includes the steps of inputting image information, detecting rotation information that shows whether an image represented by the image information is portrait-oriented or landscape-oriented, setting a cutout area that is a partial area of the image information and is to be displayed at the time of reproduction when the image represented by the image information is portrait-oriented, and recording the image information, the rotation information and information regarding the cutout area to a recording medium, with those pieces of information being correlated.

In a fifth aspect of the invention, provided is a semiconductor integrated circuit for reproducing image information from a recording medium storing the image information and rotation information that shows whether an image represented by the image information is portrait-oriented or landscape-oriented. The semiconductor integrated circuit includes: a section for reading image information from the recording medium, a section for reading rotation information of the image information from the recording medium, and a decoder for generating an image signal based on the read image information and rotation information. The decoder generates the image signal such that a cutout image including a part of an image represented by the read image information is displayed, when the rotation information shows that an image represented by the image information is portrait-oriented.

In a sixth aspect of the invention, provided is a semiconductor integrated circuit for recording an image signal. The semiconductor integrated circuit includes a section for inputting image information, a rotation information detecting section for detecting rotation information that shows whether an image represented by the image information is portrait-oriented or landscape-oriented, an area setting section for setting a cutout area that is a partial area of the image information and is to be displayed at the time of reproduction when the image represented by the image information is portrait-oriented, and a recording section for recording the image information, the rotation information and information regarding the cutout area to a recording medium, with those pieces of information being correlated.

In still another mode of the present invention, programs for making a computer execute the image reproducing method and recording method are provided.

Effects of the Invention

The present invention displays an image which is obtained by cutting out a part of a vertically long (portrait-oriented) image. The cut-out image displayed as thus described is an expanded image as compared with the case of displaying the whole of a picture so as to be included in a screen, thereby allowing further improvement in visibility of the user.

Moreover, a whole image may further be displayed in addition to the cut-out image, thereby allowing easier grasp of imagery of the whole of the image.

EXPLANATION OF REFERENCE NUMERALS

100 Image signal input section
101 Image compressing section
103 Cutout area setting section
111, 111b Image decompressing section
120 Recording section
121 Reproduction section
140 Optical disk
150 Screen of display unit
160 Continuous data area detecting section
161 Recording controller
162 Reproduction controller
163 Logic block controller
165 Rotation information detecting section
166, 168 Notable area detecting section
167 Display area movement controller
170, 170b, 170c JPEG encoder
171, 171b, 171c JPEG decoder
175 Display unit
180, 180b, 180c System controller
190 Operational unit
200, 200b, 200c Image data processing apparatus
300 Total image
301 Cutout image
302 Notable area

BEST MODE FOR CARRYING OUT THE INVENTION

In the following, embodiments of an image reproducing apparatus and an image recording apparatus according to the present invention are described with reference to attached drawings.

Embodiment 1

1. Configuration 1.1 Configuration of Image Data Processing Apparatus

Figure 1:
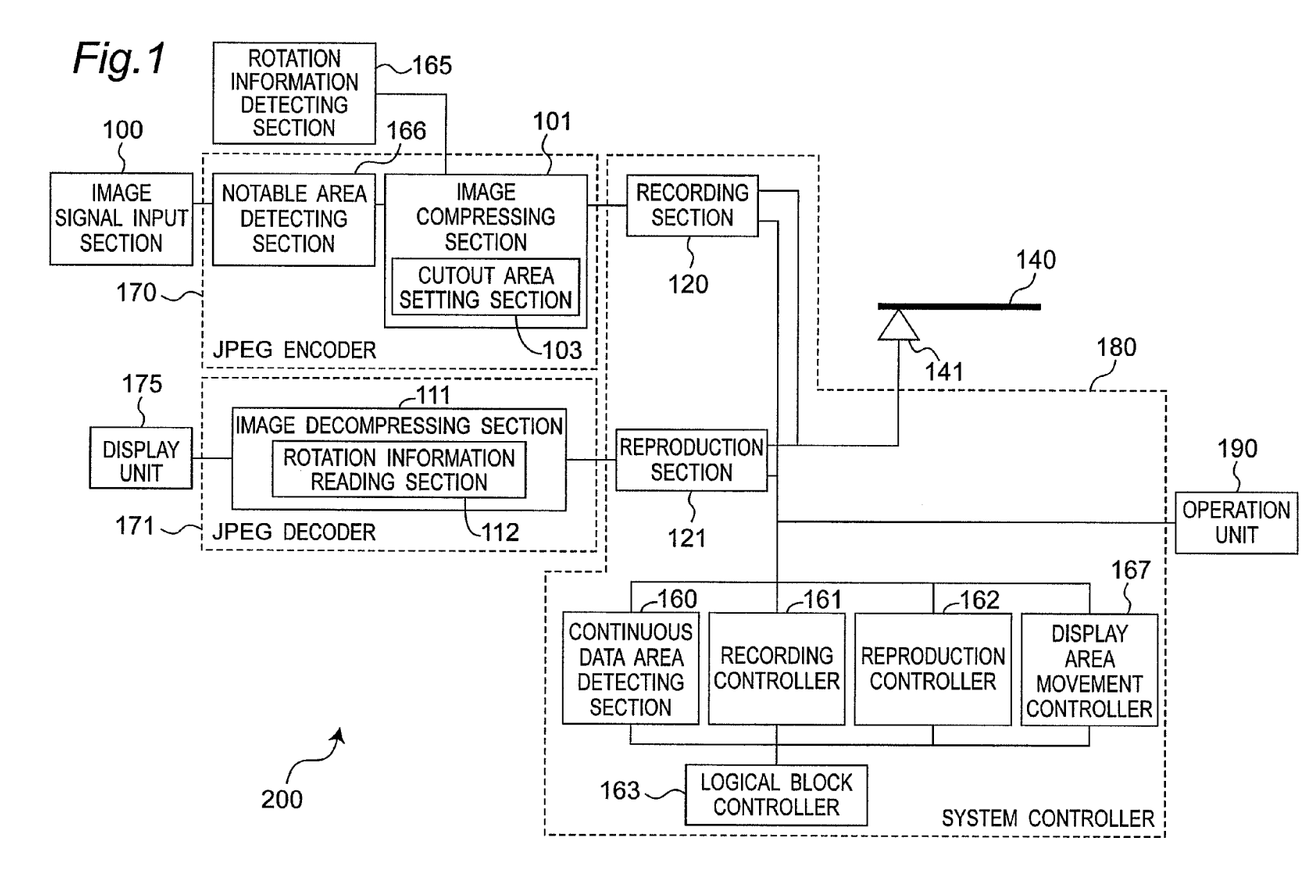
FIG. 1 is a block diagram of an image data processing apparatus according to Embodiment 1 of the present invention.

FIG. 1 is a block diagram showing a configuration of an image data processing apparatus according to Embodiment 1 of the present invention. An image data processing apparatus 200 according to the present embodiment has functions of recording and reproducing an image (including a moving image and a still image), and is, for example, a digital still camera, a camcorder, or a mobile phone with camera. A process of the image data processing apparatus with an image (video) signal showing a still picture is described below.

The image data processing apparatus 200 has an image signal input section 100 for inputting an image signal of a taken picture, a JPEG encoder 170 for compressing the inputted image signal, a JPEG decoder 171 for decompressing the compressed image signal for reproduction, a display unit 175 for displaying the image signal from the JPEG decoder 171, a system controller 180 for controlling a total operation of the image data processing apparatus 200, and an operation unit 190 to be operated by a user.

The image signal input section 100 includes elements of an optical system such as a lens and an aperture, as well as an imaging system such as a CCD, and generates an image signal having an aspect ratio of 16:9 from optical information for a subject.

The JPEG encoder 170 includes a notable area detecting section 166 for detecting an area including a predetermined feature of an image, and an image compressing section 101 for compressing an image signal in accordance with a JPEG format. The image compressing section 101 includes a cutout area setting section 103 for setting a partial area of an image (picture) represented by the image signal.

The JPEG decoder 171 includes an image decompressing section 111 for decompressing the compressed image signal. The image decompressing section 111 includes a rotation information reading section 112 for reading rotation information associated with an image signal to be reproduced.

The display unit 175 is, for example, a liquid crystal display (LCD) mounted on the image data processing apparatus 200. The aspect ratio of the screen of the display unit 175 is, for example, 16:9. It is to be noted that the image data processing apparatus 200 does not necessarily have the display unit 175. The image data processing apparatus 200 may output an image signal from the JPEG decoder 171 to an external device through an output terminal so as to display it on the external device.

The operational unit 190 has operation keys necessary for a user to perform an operation of the image data processing apparatus. For example, the operational unit 190 has up, down, left, right-keys, a cross key and a decision key.

The system controller 180 includes a recording section 120 for performing recording of image data to an optical disk 140, a recording controller 161 for controlling an operation during data recording, a reproduction section 121 for executing reproduction of the data stored to the recording medium 140, and a reproduction controller 162 for controlling an operation during data reproduction. The system controller 180 further includes a continuous data area detecting section 160, a logic block controller 163, and a display area movement controller 167. The continuous data area detecting section 160 detects free space in the optical disk 140. The logic block controller 163 controls logical blocks on the optical disk 140. The display area movement controller 167 controls an area of an image cutout and displayed in accordance with a user operation.

The optical disk 140 as a recording medium of the image information is formatted by the UDF file system. The logical block which is a management unit of the free space as well as a cutout unit of the area, is 2 kbytes.

2. Operation

An operation of the image data processing apparatus having the foregoing configuration is described below.
2.1 Recording Operation During Recording Pictures An operation for recording a still image is described. The recording controller 161 in the system controller 180 mainly performs control during recording the still image.

An image signal is inputted from the image signal input section 100 into the JPEG encoder 170. In the JPEG encoder 170, the image signal inputted from the image signal input section 100 is fed to the image compressing section 101 through the notable area detecting section 166. The image compressing section 101 compresses and encodes the still image represented by the inputted image signal to generate and output a JPEG stream [more exactly, a stream of a DCF basic file in conformity to a DCF (Design rule for Camera File system) standard]. The JPEG stream is recorded to the optical disk 140 by the recording section 120 and an optical pickup 141. More details are described below.

While the image compressing section 101 compresses and encodes a still image represented by the inputted image signal to generate the JPEG stream by the JPEG encoder 170. At that time, the notable area detecting section 166 detects, as a notable area, an area including a predetermined feature of the image represented by the inputted image signal. When that image is reproduced later, an area with this notable area placed at the center is displayed.

In the present embodiment, an area showing a feature of a person is detected as a notable area. Namely, the notable area detecting section 166 analyzes the inputted image signal to perform detection of a skin color, pattern-recognition of a face shape and pattern-recognition of a body shape of a person. Then the notable area detecting section 166 detects an area including a prescribed skin color, face shape and body shape, as the notable area, and outputs positional information thereof to the image compressing section 101. When the notable area is not detected, a default value showing an area of the central part of the image is outputted.

The cutout area setting section 103 of the image compressing section 101 receives positional information on the notable area from the notable area detecting section 166, and sets a cutout start position and a cutout end position for the image so as to include the notable area. The cutout start position and the cutout end position are expressed by two dimensional coordinate (X,Y) with a coordinate of the upper left corner of the JPEG image taken as (0,0). Information showing the cutout start position and the cutout end position is referred to as "cutout position information".

Meanwhile, the rotation information detecting section 165 determines whether the user takes a picture while holding the image data processing apparatus 200 horizontally or while holding the apparatus vertically, based on an output of a sensor built in the image data processing apparatus 200, and transmits the determination result as rotation information to the JPEG encoder 170. It is to be noted that in the following description, an image (picture), which is produced by taking an image (picture) with the image data processing apparatus 200 held horizontally and is suitable for display in the horizontal orientation, is referred to as a "landscape-oriented image (picture)". An image (picture), which is produced by taking an image (picture) with the image data processing apparatus held vertically and is suitable for display in the vertical orientation, is referred to as a "portrait-oriented image (picture)". When the JPEG encoder 170 receives rotation information from the rotation information detecting section 165, the image compressing section 101 determines a value of the orientation information in the JPEG stream in accordance with the rotation information.

The continuous data area detecting section 160 searches for a free space on the optical disk 140 before start of recording the JPEG stream. Specifically, the continuous data area detecting section 160 searches a space bit map which is managed by the logical block controller 163 and previously read from the optical disk 140, for a continuous free space.

The recording section 120 then records the JPEG stream to the searched free space on the optical disk 140. When writing of the JPEG stream is completed, UDF file management information is written, to complete writing of the DCF basic file (*.JPG file). The foregoing cutout position information and rotation information are written into the management information for the DCF basic file.

Figure 2:
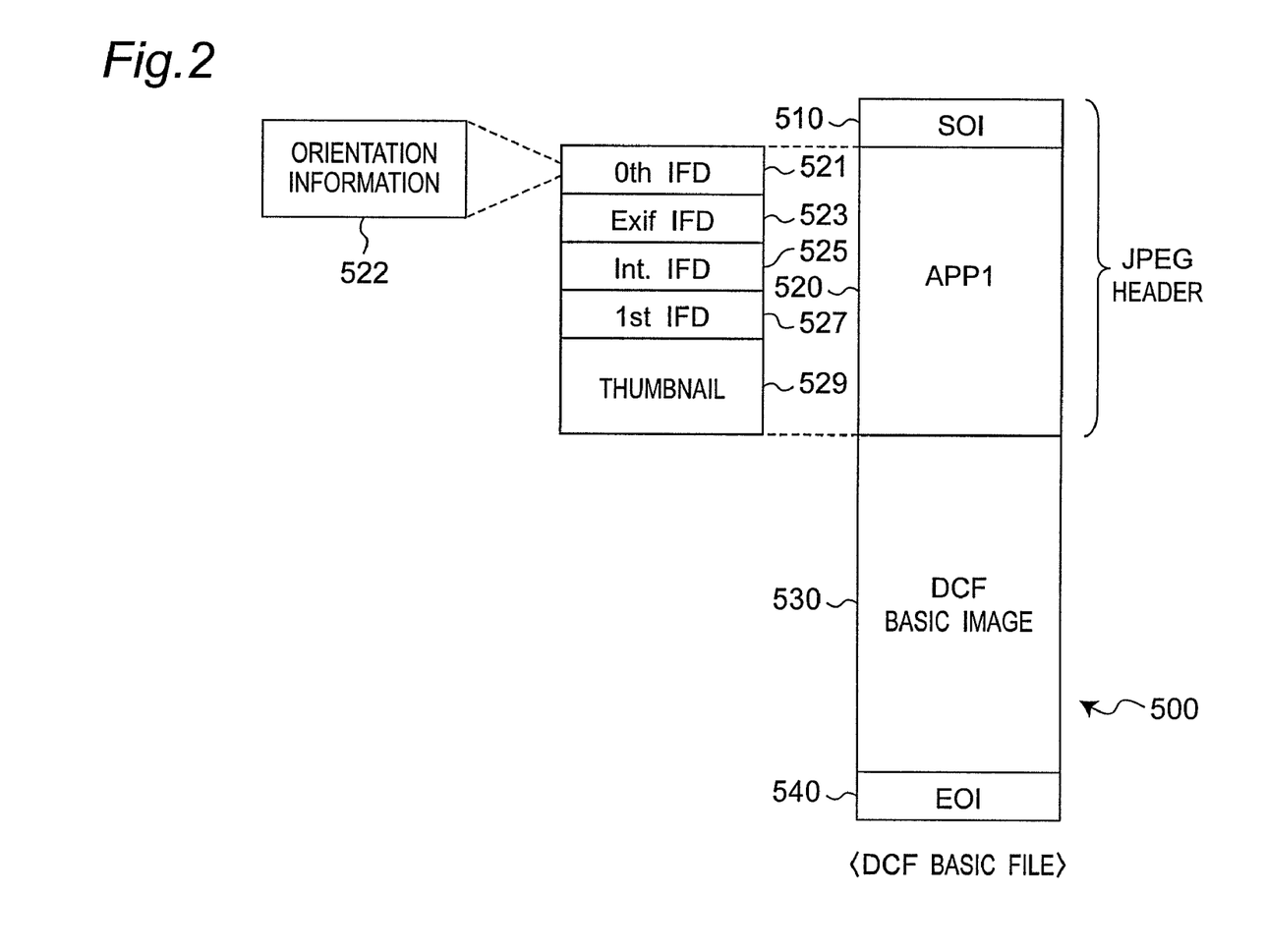
FIG. 2 is a view showing a data structure of a DCF basic file in Embodiment 1.

A data structure of the DCF basic file is described below. FIG. 2 shows data structure of the DCF basic file. A DCF basic file 500 is made up of an SOI marker 510, an APP1 marker cutout 520, a DCF basic main image 530, and an EOI marker 540. The SOI marker 210 and the APP1 marker cutout 520 are also called a JPEG header.

The APP1 marker cutout 520 includes a 0thIFD tag 521, an ExifIFD tag 523, an Interoperability tag 525, a 1stIFD tag 527, and a thumbnail image 529.

Orientation information 522 is recorded in the 0thIFD tag 521 in the APP1 marker cutout 520 in the JPEG header. A value "8" of the orientation information is a definition that the 0th row of the JPEG image is located on the "visual left-hand side" of the image and the 0th column is located on the "visual bottom" of the image, which means rotation of "90 degrees" in the present embodiment. Further, a value "1" of the orientation information is a definition that the 0th row of the JPEG image is located on the "visual top" of the image and the 0th column is located on the "visual left-hand side", and means rotation of "0 degrees" in the present embodiment.

The cutout position information is stored in a Maker Note tag in the ExifIFD tag 523.

2.2 Reproduction Operation

An operation for reproducing an image recorded on the optical disk 140 is described. A reproduction controller 162 in the system controller 180 mainly performs control during reproduction.

2.2.1 Example of Image Display

Figure 3A:
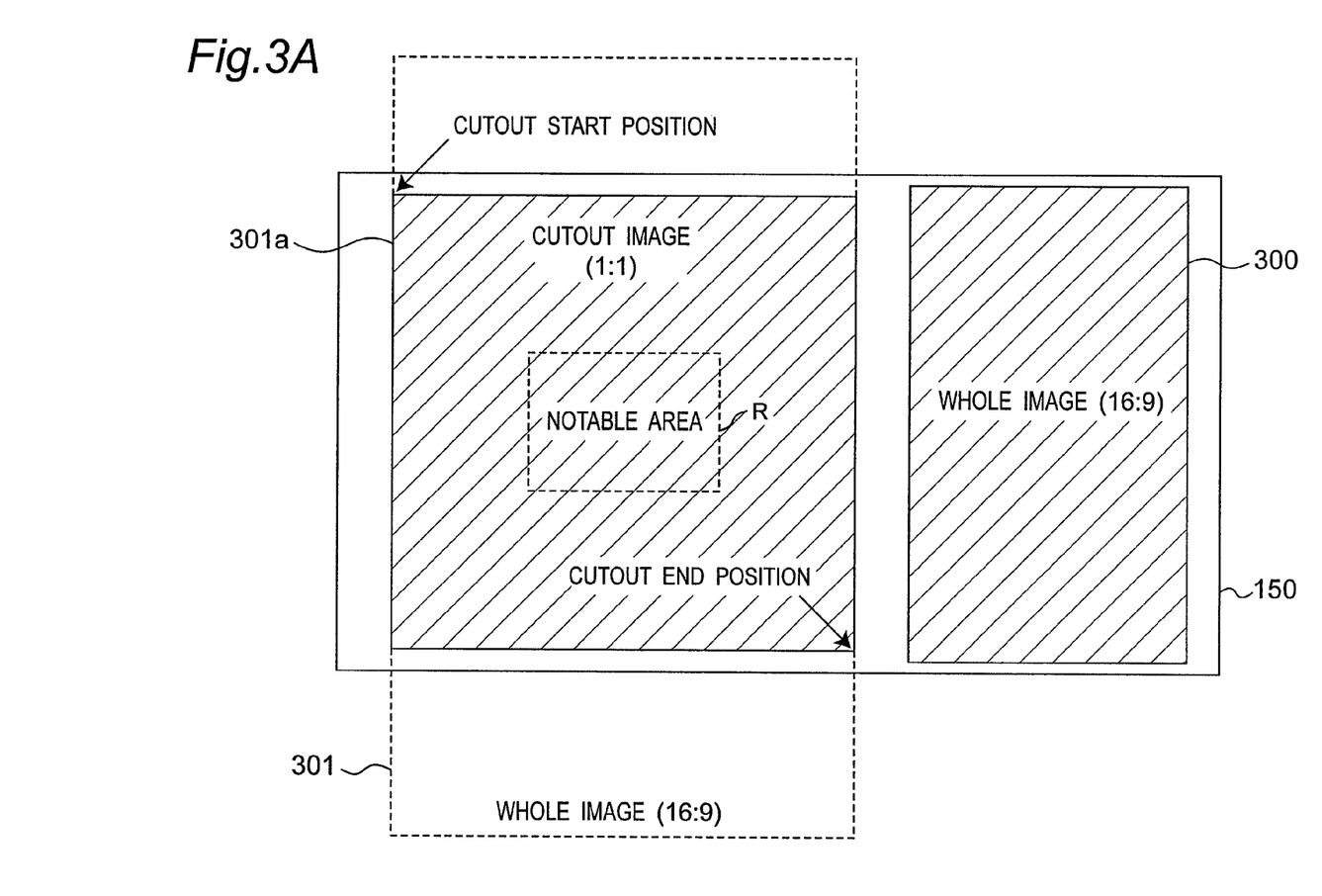
FIG. 3A is a view showing an example of display in which a vertically long (portrait-oriented) image is reproduced in Embodiment 1.

FIG. 3A shows an example of display of a still image on a screen 150 of the display unit 175. FIG. 3A particularly shows an example of display when reproducing an image which was taken in such state that the image data processing apparatus 200 was rotated by 90 degrees or 270 degrees, that is, the image data processing apparatus 200 was held in the vertical orientation.

As shown in the figure, a whole image 300 including all image area to be reproduced and a partial image (hereinafter referred to as "cutout image") 301a including only a partial range of the reproduced image are displayed on the display screen 150. The cutout image 301a can be an image obtained by substantially expanding a part of the whole image 300. The area 301 indicated by a dotted line in the figure shows a range of the whole image including the cutout image 301a. As thus described, in the present embodiment, regarding the portrait-oriented image to be reproduced, the cutout image 301a obtained by cutting out a part of the reproduced image is displayed together with the image 300 showing the whole of the reproduced image. The image which is cut out in such a way includes the expanded image as compared with the whole image 300 displayed so as to include its entirety within the screen. Therefore, referencing to the cutout image 301a further facilitates a user to grasp the image. It is to be noted that in FIG. 3A, the area surrounded by a dotted line R corresponds to a notable area detected by the notable area detecting section 166. In such a manner, the cutout image 301a is displayed such that the notable area is placed at the center of the display.

A rotational direction of the image can be determined by reference to orientation information stored in the JPEG header. When an image to be reproduced is a portrait-oriented image, the cutout image 301a is displayed along with the whole reproduced image 300 with an aspect ratio of 16:9. In the example of FIG. 3A, the aspect ratio of the cutout image is substantially 1:1.

According to the conventional image recording apparatus, the portrait-oriented image is displayed as shown in FIG. 6A, while the image is displayed as shown in FIG. 3A according to the present embodiment. Therefore legibility of the image can be further improved.

2.2.2. Reproduction Operation

During reproduction, the reproduction section 121 grasps the state of the DCF basic file of the image recorded on the optical disk 140, and selects a file name of a latest, i.e. lastly recorded, DCF basic file, to read a JPEG stream (data stream) of the DCF basic file from the optical disk 140. The image decompressing section 111 decompresses the read JPEG stream and outputs the stream to the display unit 175.

Specifically, the image decompressing section 111 reads the orientation information from the JPEG header in the JPEG stream by the rotation information reading section 112. When the orientation information shows "90 degrees" or "270 degrees", namely when the reproduced image is portrait-oriented, the image decompressing section 111 reads the cutout position information from the JPEG header, and sets a cutout position of a cutout image as shown in FIG. 6A based on the read cutout position information. The image decompressing section 111 then rotates the JPEG stream by 90 degrees or 270 degrees as displayed in FIG. 6A to generate an image signal for display. On the other hand, when the orientation information shows "0 degrees", namely when the reproduced image is landscape-oriented, the image decompressing section 111 generates the image signal for display without rotating the JPEG stream as shown in FIG. 6B.

As thus described, in the present embodiment, when the still image is reproduced, the JPEG decoder 171 makes display as shown in FIG. 6B in the case of the orientation information showing 0 degrees, while making display as shown in FIG. 3A in the case of 90 degrees or 270 degrees. By this arrangement, even if an image to be reproduced is portrait-oriented, a part of it is expanded and displayed, thereby facilitating recognition of the image.

It is to be noted that at the time of image display, after a cutout image is displayed first, the cutout image may be automatically scrolled up, then scrolled down, and thereafter scrolled up again so as to recover to the firstly displayed state. Since also in such a display method, the whole of the image can be grasped from the expanded image, thereby facilitating a user to recognize the image.

2.2.3 Movement of Cutout Area

The image data processing apparatus of the present embodiment is capable of scrolling or moving the cutout image 301a in up-down and left-right directions by a user operation through the operational unit 190 with the JPEG stream in the state of being once displayed on the display screen 150 as shown in FIG. 3A. At this time, it is a display area movement controller 167 that controls movement on the screen.

Figure 3B:
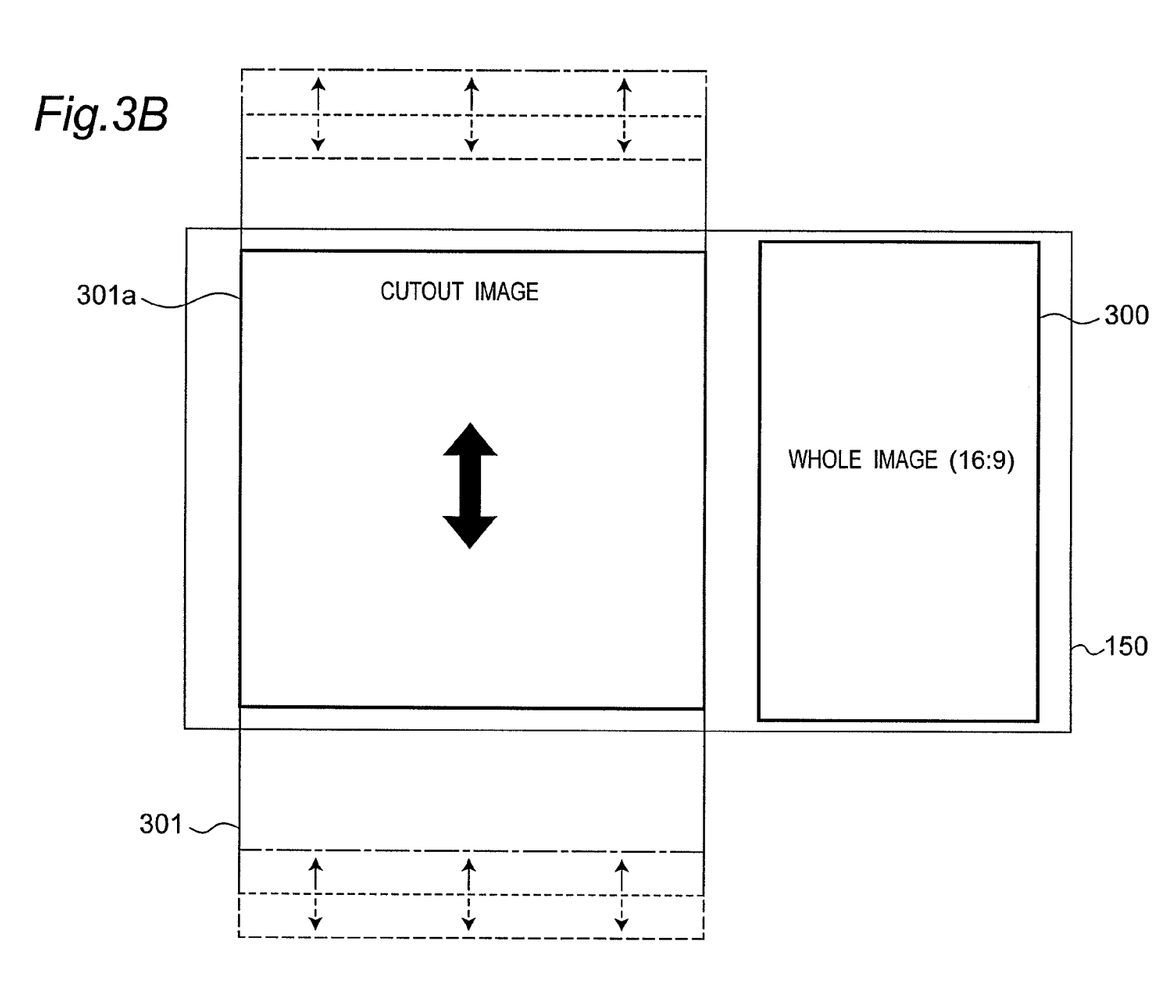
FIG. 3B is a view for explaining movement of a cutout image in Embodiment 1.

In a case where the whole image 300 and the cutout image 301a are displayed on the display screen 150 as shown in FIG. 3A, when an up key or a down key is pressed by a user on the operational unit 190, the cutout image 301a is scrolled in a direction corresponding to the pressed key (see FIG. 3B). The display area movement controller 167 instructs the JPEG decoder 171 to cause the cutout image 301a to be scrolled in the direction corresponding to the pressed key and displayed.

When the cutout image 301a is made as desired, the user presses a decision key on the operational unit 190 for newly setting the area of the cutout image 301a to the cutout area. In response to this operation, the display area movement controller 167 sets cutout position information from the position of the displayed cutout image 301a. The recording controller 161 rewrites the DCF basic file such that the cutout position information is included in the MakerNote tag in the ExifIFD tag 523 of the DCF basic file of the image being reproduced. In this manner, the cutout position information newly set by the user is stored, and referred to at the time of next reproduction, thereby allowing automatic display of a cutout image in accordance with preferences of the user.

3. Summary

As thus described, according to the present embodiment, during reproduction of an image which is taken with an imaging apparatus held in the vertical orientation, namely a portrait-oriented image, the image is partially cut out and displayed. It is thereby possible to display in a larger scale, though partially, the portrait-oriented image which would be displayed in a relatively small size on a landscape-oriented screen in a prior art. This can improve visibility by the user.

Embodiment 2

Although according to Embodiment 1 the notable area is detected at the time of recording, the notable area is detected at the time of reproduction in the present embodiment.

Figure 4:
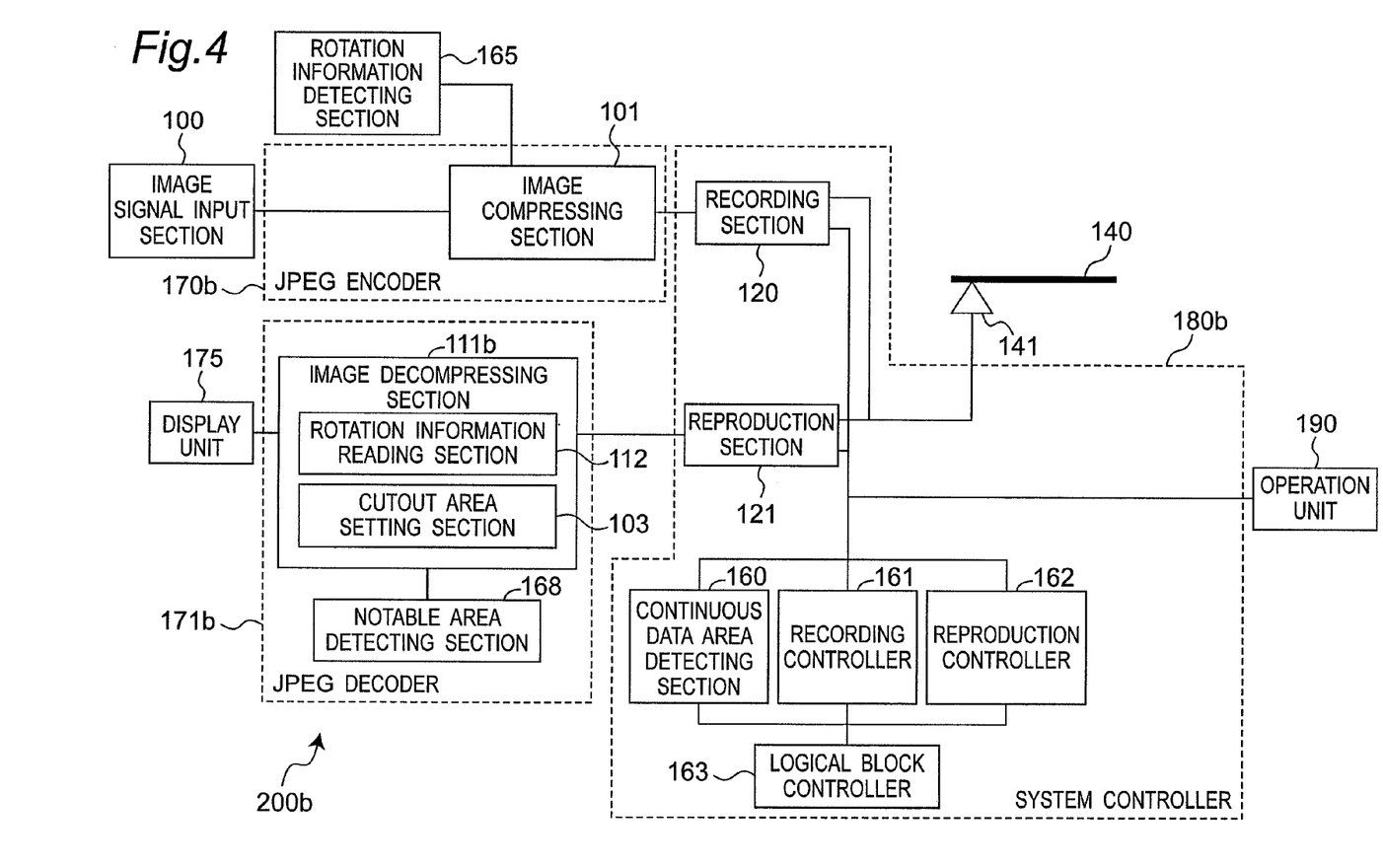
FIG. 4 is a block diagram of an image data processing apparatus according to Embodiment 2 of the present invention.

FIG. 4 shows a configuration of an image data processing apparatus of the present embodiment. An image data processing apparatus 200b of the present embodiment is different from that of Embodiment 1 in that the notable area detecting section 168 is provided in a JPEG decoder 171b and the image decompressing section 111b includes a cutout area setting section. Further, the image data processing apparatus 200b is different from that of Embodiment 1 in that a system controller 180b does not have the display area movement controller 167.

The operation at the time of recording is basically the same as that of Embodiment 1 except that the notable area is not detected by a JPEG encoder 170b.

At the time of reproduction, the notable area detecting section 168 receives image information from the image decompressing section 111b, to detect the notable area. The notable area detecting section 168 notifies the image decompressing section 111b of the detection result. The image decompressing section 111b sets a cutout area by the cutout area setting section 103 based on information on the notable area from the notable area detecting section 168, to generate an image signal for displaying a cutout image.

It is to be noted that the notable area detecting section 168 starts its operation only when the reproduced image is a portrait-oriented image. Other configurations and operations are the same as in the case of Embodiment 1.

According to the present embodiment, there is an advantage of being capable of supporting a DCF basic file not having cutout start position information in the JPEG stream as compared with the case of detecting the notable area at the time of recording.

MODIFIED EXAMPLES

In the foregoing embodiments, the following modifications can be considered.

(1) Although the case was described in the above embodiments where the picture having the aspect ratio of 16:9 is recorded and displayed on the monitor having the aspect ratio of 16:9, the aspect ratio is not restricted to this value. For example, a case may be considered where a picture having an aspect ratio of 3:2 is recorded and displayed on the monitor having the aspect ratio of 16:9.

(2) Although the example of recording the DCF basic file was described in the above embodiments, the image format may be another format. For example, Exif (Exchangeable Image File Format) image file or TIFF (Tagged Image File Format) image file may be applied. Further, a moving image stream file including an MPEG system stream and a QuickTime stream may be applied.

(3) In the above embodiments, a pixel aspect ratio is set for square pixel in accordance be with DCF, but it may set for a rectangular pixel.

(4) Although the recording medium which stores a data stream and the like is a removable optical disk in the above embodiments, it is not necessarily removable media. The recording medium may be a noncommutative media, e.g. a hard disk drive (HDD) built in the image data processing apparatus. Further, the recording medium for storing images and the image data processing apparatus may be connected to network.

(5) In the above embodiments, the optical disk includes DVD-RAM, MO, DVD-R, DVD-RW, DVD+RW, DVD+R, CD-R, CD-RW, BD-RE, BD-R and HD-DVD. Further, as the recording medium in place of the optical disk, a semiconductor memory such as a memory card, a flash memory, FeRAM or MRAM, or a hard disk drive may be used.

(6) Although the UDF file system is adopted in the above embodiments, the version of the UDF file system may be any one of 1.5, 2.0, 2.01, 2.5 and 2.6. In particular, the version 2.6 is useful since not requiring the process of writing of file control data in write-once type media. A different file system may be adopted in place of the UDF file system so long as having the same configuration as the UDF file system.

Figure 5:
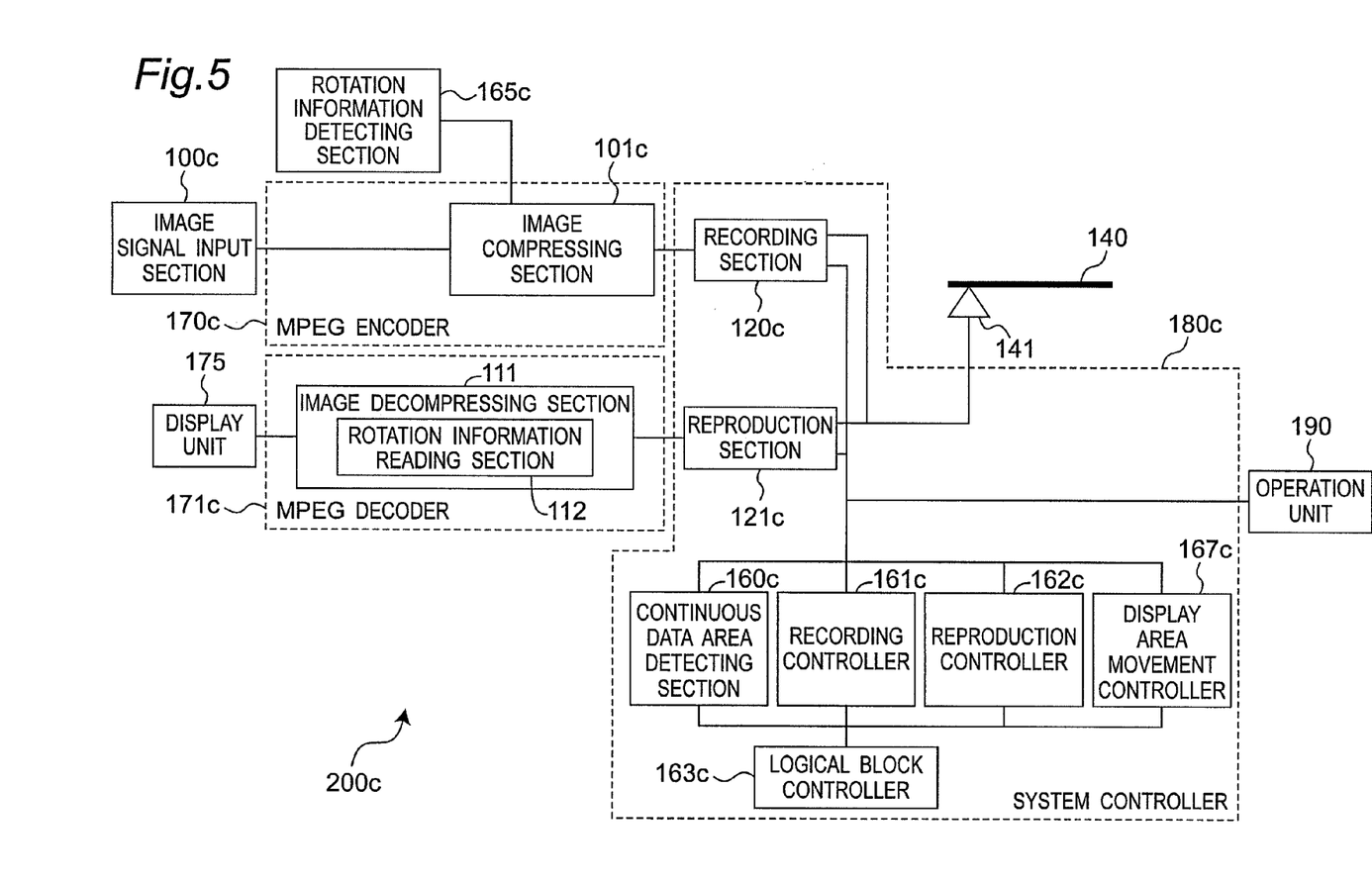
FIG. 5 is a block diagram of an image data processing apparatus in another example (compliant with MPEG) in an embodiment of the present invention.

(7) Each of the function blocks shown in FIGS. 1, 4 and 5 may be realized as a chip of a semiconductor integrated circuit (Large Scale Integrated Circuit; LSI). These functions may be set individually to the respective chip, or set integrally to one chip so as to include part or the whole of the function block. For example, in FIG. 1, the JPEG encoder 170 and the system controller 180 are shown as individual function blocks. These may be implemented in individual semiconductor chips, or may be realized physically in the same one chip. Further, the functions of the system controller 180, the JPEG encoder 170 and the JPEG decoder 171 are integrated and realized by one chip circuit. In this case, a memory for storing data to be encoded (compressed) or decoded (extended) may be excluded from subjects to be integrated.

The foregoing integrated circuit is called an IC, a system LSI, a super LSI, or an ultra LSI, depending upon a difference in scale of integration. The method for realizing an integrated circuit is not limited to LSI, but the integrated circuit may be realized by a dedicated circuit or a multipurpose processor. An FPGA (Field Programmable Gate Array) which is programmable after manufacturing of an LSI or reconfigurable processor capable of reconfiguring connection and setting of a circuit cell in an LSI may be applied.

Further, when a technology for realizing an integrated circuit that replaces an LSI appears due to the advance of the semiconductor technology or another technology derived therefrom, function blocks may be integrated using that technology. For example, integration is performed to give a so-called biodevice using the biotechnology.

(8) The foregoing functions of the image data processing apparatus can also be realized by a CPU or an MPU executing a computer program stored in a program RCM or the like.

(9) Although the cutout start position information and the cutout end position information are referred to at the time of reproduction in the above embodiments, it is understood that such information may not be referred to and the cutout position may be determined in advance to be the central section of an image or the like.

(10) Although the whole image 300 and the cutout image 301a are concurrently displayed in the above embodiments, the cutout image 301a may be displayed alone after a lapse of predetermined time (e.g. several seconds) from display of the whole image 300 alone. The display order may be opposite thereto. Subsequently, the whole image 300 and the cutout image 301a may be alternately displayed, or the whole image 300 and the cutout image 301a are concurrently displayed.

(11) Although the whole image 300 and the partially cutout image 301a are concurrently displayed when the reproduced image is portrait-oriented in the case of the above embodiment, the cutout image 301a may be displayed alone. This is because, since the cutout image 301a includes an expanded image, the image can be easily recognized even with the cutout image 301a alone displayed. In that case, when the user newly sets a cutout area by operating a cross key operation on the operational unit 190, information on the newly set cutout area may be stored to a user note in the DCF basic file.

(12) Although the examples of recording and reproduction of the JPEG stream including still picture data are described in the above embodiments, the concept of the present invention is similarly applicable to those including moving picture data such as an MPEG-2 video stream an MPEG-4 video stream and an MPEG-4AVC(H.264) stream. Namely, as shown in FIG. 3A, part of the image may be cut out and displayed, when a moving picture to be reproduced is portrait-oriented. FIG. 5 shows a configuration of an image data processing apparatus when an image signal displays a moving picture. The image data processing apparatus shown in the figure has an MPEG encoder 170c and an MPEG decoder 171c which are capable of compressing and decompressing moving picture data in place of the JPEG encoder and the JPEG decoder in the configuration shown in FIG. 1. Further, in case of the moving picture, a cutout image may significantly fluctuate within a screen when the cutout image is determined in accordance with a notable area. Therefore the configuration of FIG. 5 does not include the notable area detecting section.

(13) It is possible to move a cutout image by a user operation at the time of displaying the cutout image in the above embodiment. Further, it may be made possible to arbitrarily change a zoom of the cutout image. In this case, zoom information set by the user may be held in the JPEG header of the DCF basic file, to be referred to in next reproduction. This allows automatic display of the cutout image in accordance with preferences of the user.

INDUSTRIAL APPLICABILITY

The present invention, during reproduction of a portrait-oriented image which is recorded, can display an image partially cut out from the portrait-oriented image, thus improving visibility of the user when displaying the portrait-oriented image on a wide screen. Hence the present invention is useful for an apparatus capable of taking a picture and recording it to a recording medium, such as a digital still camera, a camcorder, and a camera-equipped mobile phone.

Although the present invention was described concerning the specific embodiments, a modified example, correction and other applications are obvious for the skilled person in the art. Accordingly, the present invention is not limited to the specific disclosure here, but can be limited only by the attached claims. It is to be noted that the present invention relates to Japanese Patent Application No. 2005-310754 (filed on Oct. 26, 2005), of which contents are incorporated herein by reference.

The invention claimed is:

1. An image reproducing apparatus for reproducing image information from a recording medium which stores image information and rotation information that shows whether an image represented by the image information is portrait-oriented or landscape-oriented, the image reproducing apparatus comprising:
    a reading section that reads image information from the recording medium;
    a rotation information reading section that reads rotation information of the image information from the recording medium; and
    a decoder that generates an image signal such that a cutout image which is less than the whole image represented by the read image information is displayed, when the rotation information shows that the image represented by the image information is portrait-oriented, and that generates the image signal such that the whole image represented by the read image information is displayed, when the rotation information shows that the image represented by the image information is landscape-oriented;
    wherein the decoder generates the image signal such that the whole image represented by the read image information is displayed concurrently with the cutout image when the rotation information shows that the image represented by the image information is portrait-oriented.

2. The image reproducing apparatus according to claim 1, wherein
    the recording medium stores information regarding a cutout area of the image information, and
    the decoder reads the information regarding the cutout area from the recording medium, and sets an area of the cutout image in accordance with the information.

3. The image reproducing apparatus according to claim 2, wherein the cutout area includes at least one of an area with skin color, an area including a face, and an area in which a person appears, which are included in the image information.

4. The image reproducing apparatus according to claim 2, further comprising:
    an operational unit on which movement information for the area of the cutout image is inputted with a user operation;
    a display area moving section that controls movement of the area of the cutout image in accordance with the movement information on the operational unit; and
    a recording section that stores, in the recording medium, information regarding the area of the cutout image determined by a user operation.

5. The image reproducing apparatus according to claim 1, wherein the image information has an aspect ratio of 16:9.

6. An image reproducing method of reproducing image information from a recording medium storing the image information and rotation information that shows whether an image represented by the image information is portrait-oriented or landscape-oriented, the image reproducing method comprising:
    reading image information from the recording medium;
    reading rotation information of the image information from the recording medium; and
    generating an image signal such that a cutout image which is less than the whole image represented by the read image information is displayed concurrently with the whole image, when the rotation information shows that an image represented by the image information is portrait-oriented, and generating the image signal such that the whole image represented by the read information is displayed, when the rotation information shows that the image represented by the image information is landscape-oriented.

7. A computer readable storage medium storing a program for making a computer execute the image reproducing method according to claim 6.

8. A semiconductor integrated circuit for reproducing image information from a recording medium storing the image information and rotation information that shows whether an image represented by the image information is portrait-oriented or landscape-oriented, the semiconductor integrated circuit comprising:

a section for reading image information from the recording medium;

a section for reading rotation information of the image information from the recording medium; and a decoder that generates an image signal such that a cutout image which is less than the whole image represented by the read image information is displayed concurrently with the whole image, when the rotation information shows that an image represented by the image information is portrait-oriented, and that generates the image signal such that the whole image represented by the read image information is displayed, when the rotation information shows that the image represented by the image information is landscape-oriented.

\* \* \* \* \*